(12) United States Patent
Hisatomi

(10) Patent No.: US 8,478,910 B2
(45) Date of Patent: Jul. 2, 2013

(54) SUPPLY DEVICE AND PROCESSING DEVICE AS WELL AS INSTRUCTION METHOD

(75) Inventor: Shuichi Hisatomi, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1989 days.

(21) Appl. No.: 11/602,265

(22) Filed: Nov. 21, 2006

(65) Prior Publication Data

US 2007/0123104 A1    May 31, 2007

(30) Foreign Application Priority Data

Nov. 29, 2005  (JP) ................................. 2005-344022

(51) Int. Cl.
*G06F 3/00*  (2006.01)

(52) U.S. Cl.
USPC ................................................. 710/30; 710/5

(58) Field of Classification Search
USPC ....................................................... 710/5, 30
See application file for complete search history.

(56) References Cited

FOREIGN PATENT DOCUMENTS

| JP | 2-205179 | 8/1990 |
|---|---|---|
| JP | 2003-046535 | 2/2003 |
| JP | 2004-179899 | 6/2004 |
| JP | 2005-184079 | 7/2005 |
| JP | 2007-141345 | 6/2007 |
| WO | WO 2005/015901 | 2/2005 |
| WO | WO 2005/098854 | 10/2005 |

OTHER PUBLICATIONS

High-Definition Multimedia Interface Specification Version 1.2, Aug. 22, 2005, Hitachi, Ltd., Matsushita Electric Industrial Co., Ltd. Philips Consumer Electronics, International B.V., Silicon Image, Inc., Sony Corporation, Thomson Inc., Toshiba Corporation.*
"High-Definition Multimedia Interface, Specification Version 1.2a," HDMI Licensing, LLC (Dec. 14, 2005), pp. i-110 and CEC-i-CEC-62.
McGeehan et al., "EIA/CEA-861B, A DTV Profile for Uncompressed High Speed Digital Interfaces," EIC/CEA-861B DRAFT 020328 (Mar. 28, 2002), pp. i-116.
Notice of Reasons for Rejection mailed Nov. 9, 2010, from the Japanese Patent Office for Japanese Patent Application No. 2005-344022 (3 pages).

* cited by examiner

*Primary Examiner* — Farley Abad
(74) *Attorney, Agent, or Firm* — Finnegan, Henderson, Farabow, Garrett & Dunner LLP

(57) ABSTRACT

According to one embodiment, there is provided an instruction method for providing an instruction from a supply device to a processing device via an HDMI cable, the method comprising detecting a signal from an operating switch in the supply device, generating a packet signal in which instruction information according to the detected signal is described, in an ASCII description area of source product description (SPD) of a packet signal for use in the HDMI standard, in the supply device, supplying the packet signal from the supply device to the processing device via the HDMI cable, and detecting the instruction information from the ASCII description area of SPD of the packet signal in the supply device, and performing a desired operation accordingly.

10 Claims, 7 Drawing Sheets

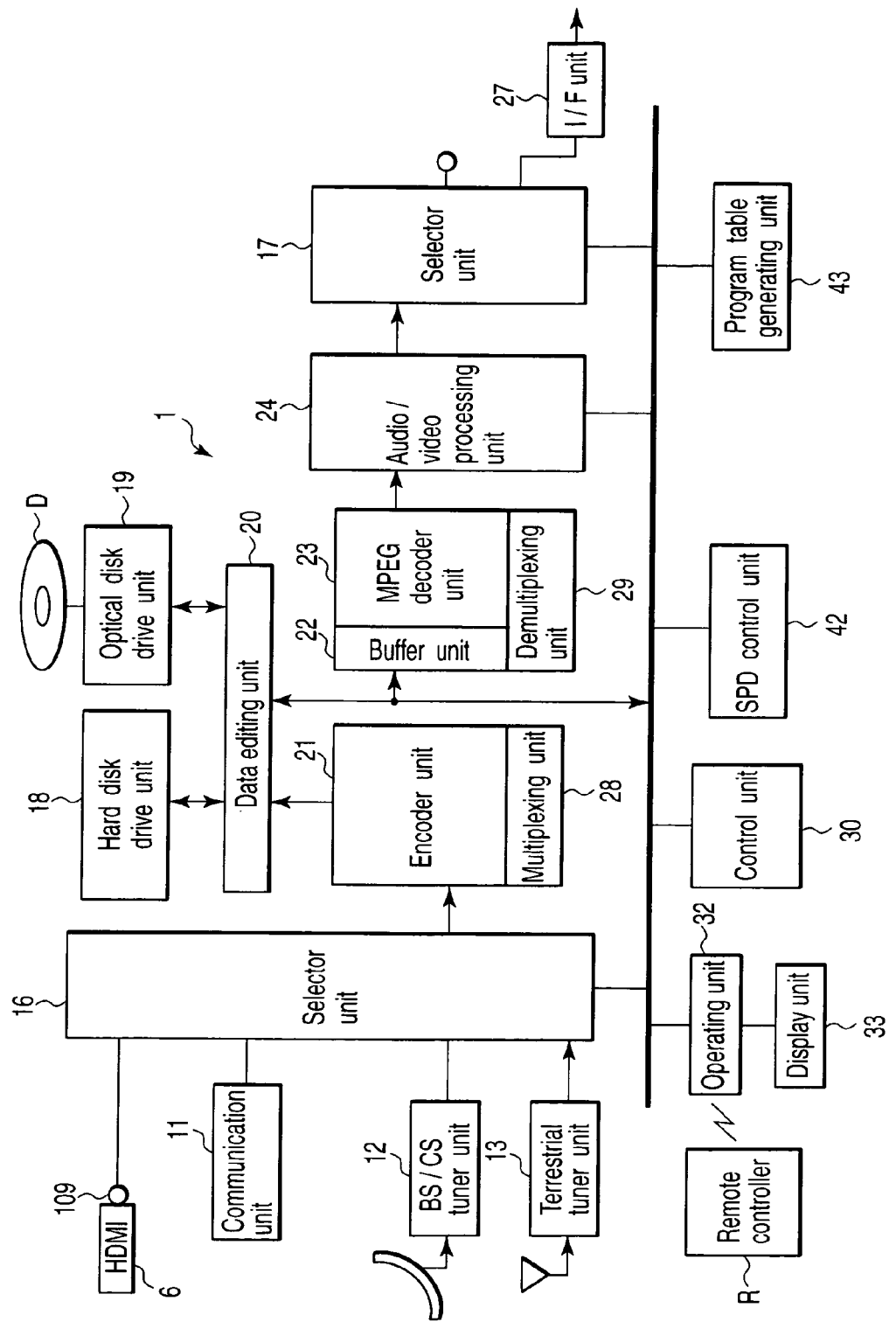
F I G. 2

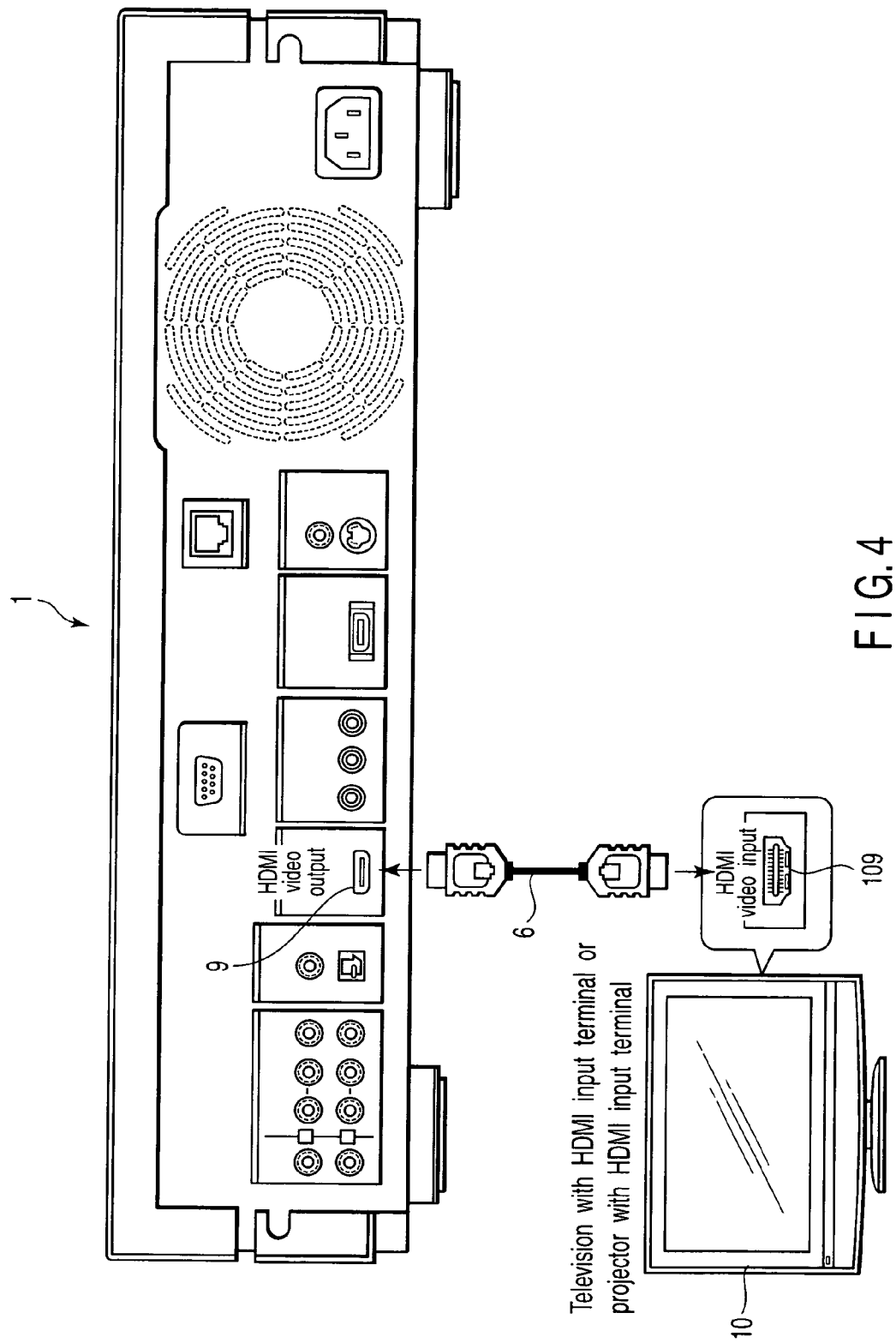
F I G. 4

| PIN | Signal Assignment |
|---|---|
| 1 | TMDS Data2+ |
| 3 | TMDS Data2- |
| 5 | TMDS Data1 Shield |
| 7 | TMDS Data0+ |
| 9 | TMDS Data0- |
| 11 | TMDS Clock Shield |
| 13 | CEC |
| 15 | SCL |
| 17 | DDC / CEC Ground |
| 19 | Hot Plug Detect |

| PIN | Signal Assignment |
|---|---|
| 2 | TMDS Data2 Shield |
| 4 | TMDS Data1+ |
| 6 | TMDS Data1- |
| 8 | TMDS Data0 Shield |
| 10 | TMDS Clock+ |
| 12 | TMDS Clock- |
| 14 | Reserved (N.C. on device) |
| 16 | SDA |
| 18 | +5V Power |

FIG. 5

| Packet Type Value | Packet Type |
|---|---|
| 0x00 | Null |
| 0x01 | Audio Clock Regeneration (N/CTS) |
| 0x02 | Audio Sample (L-PCM and compressed fomats) |
| 0x03 | General Control |
| 0x04 | ACP Packet |
| 0x05 | ISRC1 Packet |
| 0x06 | ISRC2 Packet |
| 0x07 | One Bit Audio Sample Packet |
| 0x80+InfoFrame Type | EIA / CEA-861B InfoFrame |
| 0x81 | Vendor-Specific InfoFrame |
| 0x82 | AVI InfoFrame* |
| 0x83 | Source Product Descriptor InfoFrame |
| 0x84 | Audio InfoFrame* |
| 0x85 | MPEG Source InfoFrame |

FIG. 6

EIA/CEA-861B DRAFT 020328

Table 16. Source Product Description InfoFrame format

| InfoFrame Type Code | InfoFrame Type = $03_{16}$ (new) | | |
|---|---|---|---|
| InfoFrame Version Number | Version = $01_{16}$ | | |
| Length of Source Product Description InfoFrame | Length of Source Product Description InfoFrame = 25 | | |
| Data Byte 1 | 0 | Vendor Name Character 1 VN1 (7bit ASCII code) | |
| Data Byte 2 | 0 | Vendor Name Character 2 VN2 | |
| Data Byte 3 | 0 | Vendor Name Character 3 VN3 | |
| Data Byte 4 | 0 | Vendor Name Character 4 VN4 | |
| Data Byte 5 | 0 | Vendor Name Character 5 VN5 | |
| Data Byte 6 | 0 | Vendor Name Character 6 VN6 | |
| Data Byte 7 | 0 | Vendor Name Character 7 VN7 | |
| Data Byte 8 | 0 | Vendor Name Character 8 VN8 | |
| Data Byte 9 | 0 | Product Description Character 1 PD 1(7bit ASCII code) | |
| Data Byte 10 | 0 | Product Description Character 2 PD 2 | |
| Data Byte 11 | 0 | Product Description Character 3 PD 3 | |
| Data Byte 12 | 0 | Product Description Character 4 PD 4 | |
| Data Byte 13 | 0 | Product Description Character 5 PD 5 | |
| Data Byte 14 | 0 | Product Description Character 6 PD 6 | |
| Data Byte 15 | 0 | Product Description Character 7 PD 7 | |
| Data Byte 16 | 0 | Product Description Character 8 PD 8 | |
| Data Byte 17 | 0 | Product Description Character 9 PD 9 | |
| Data Byte 18 | 0 | Product Description Character 10 PD 10 | |
| Data Byte 19 | 0 | Product Description Character 11 PD 11 | |
| Data Byte 20 | 0 | Product Description Character 12 PD 12 | |
| Data Byte 21 | 0 | Product Description Character 13 PD 13 | |
| Data Byte 22 | 0 | Product Description Character 14 PD 14 | |
| Data Byte 23 | 0 | Product Description Character 15 PD 15 | |
| Data Byte 24 | 0 | Product Description Character 16 PD 16 | |
| Data Byte 25 | Source Device Informaition (see below) | | |

ASCII description area

The Vendor Name consists of eight 7-bit ASCII characters. The name should be left justified (i.e., first character in Data Byte 1) and all unused characters should be Null (i.e.,$00_{16}$). The Vendor Name is internded to be the name of the company whose name appears on the product. The Product Description (contained in Data Bytes 9-24) consists of sixteen 7-bit ASCII characters. This code is meant to be the model number of the product and may contain a short description also (e.g.,RC5240 DVD Plyer). Date Byte 25 consists of a code that classifies the source device. Codes for the most common types of source devices are shown in Table 17.

F I G. 7

SUPPLY DEVICE AND PROCESSING DEVICE AS WELL AS INSTRUCTION METHOD

CROSS-REFERENCE TO RELATED APPLICATIONS

This application is based upon and claims the benefit of priority from Japanese Patent Application No. 2005-344022, filed Nov. 29, 2005, the entire contents of which are incorporated herein by reference.

BACKGROUND

1. Field

One embodiment of the invention relates to a processing device that performs a predetermined process according to an instruction from a supply device, and more specifically, to a supply device and a processing device that make an instruction by use of the high definition multimedia interface (HDMI: registered trademark) and an instruction method between the devices.

2. Description of the Related Art

Recently, digital apparatuses for handling video signals have spread widely, and these video apparatuses can arbitrarily communicate content signals and operation signals with one another via a communication cable or the like. Communications by different communication standards are possible among the video apparatuses. An example of a recently known communication standard is HDMI (Non-patent Document 1: High Definition Multimedia Interface) (HDMI Licensing LLC, High-Definition Multimedia Interface Specification Version 1.2, Non-patent Document 2: EIA/CEA-861-B ADTV Profile for Uncompressed High Speed Digital Interface).

Patent Document 1 (Jpn. Pat. Appln. KOKAI Publication No. 2005-184079) discloses an AV network correspondence recording and reproducing apparatus using HDMI, and the apparatus performs operation control of recording and reproduction by use of HDMI commands.

In the Patent Document 1, however, it cannot be said that possibilities of the HDMI standard are utilized sufficiently. For example, in the HDMI standard, there is an area of Device Information of source product description (SPD) that enables relatively free definition, and such an area is not sufficiently utilized, which has been a problem in the prior art.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is a block diagram showing an example of the configuration of a supply device according to an embodiment of the invention;

FIG. 4 is an explanatory view showing connection between a supply device and a processing device according to an embodiment of the invention;

FIG. 5 is an explanatory table showing an example of pin signals of an HDMI cable used in a supply device and a processing device according to an embodiment of the invention;

FIG. 6 is an explanatory table showing an example of a plurality of packet types of HDMI interface according to an embodiment of the invention;

FIG. 7 is an explanatory table showing an example of source product descriptor InfoFrame (SPD) as one of packet types of HDMI interface according to an embodiment of the invention.

DETAILED DESCRIPTION

Various embodiments according to the invention will be described hereinafter with reference to the accompanying drawings. In general, according to one embodiment of the invention, there is provided a supply device comprising: an operating unit which detects a signal from an operating switch; a generating unit which generates a packet signal in which instruction information in response to the detected signal from the operating unit is described in an ASCII description area of source product description (SPD) of a packet signal for use in the HDMI standard; and an interface unit which supplies the packet signal from the generating unit to an external device via an HDMI cable.

According to another embodiment of the invention, there is provided a processing device comprising: an interface unit which receives a packet signal from an external device via an HDMI cable in the HDMI standard; a detecting unit which detects instruction information from an ASCII description area of SPD of the packet signal; and a control unit which, upon detecting the instruction information from the ASCII description area of SPD of the packet signal detected by the detecting unit, controls the processing device so as to perform a predetermined operation according to the detection.

By use of the ASCII description area of SPD of the HDMI standard, a desired instruction can be made from the supply device to the processing device.

Embodiments according to the present invention will be described in more details with reference to the accompanying drawings hereinafter.

Figure 1:
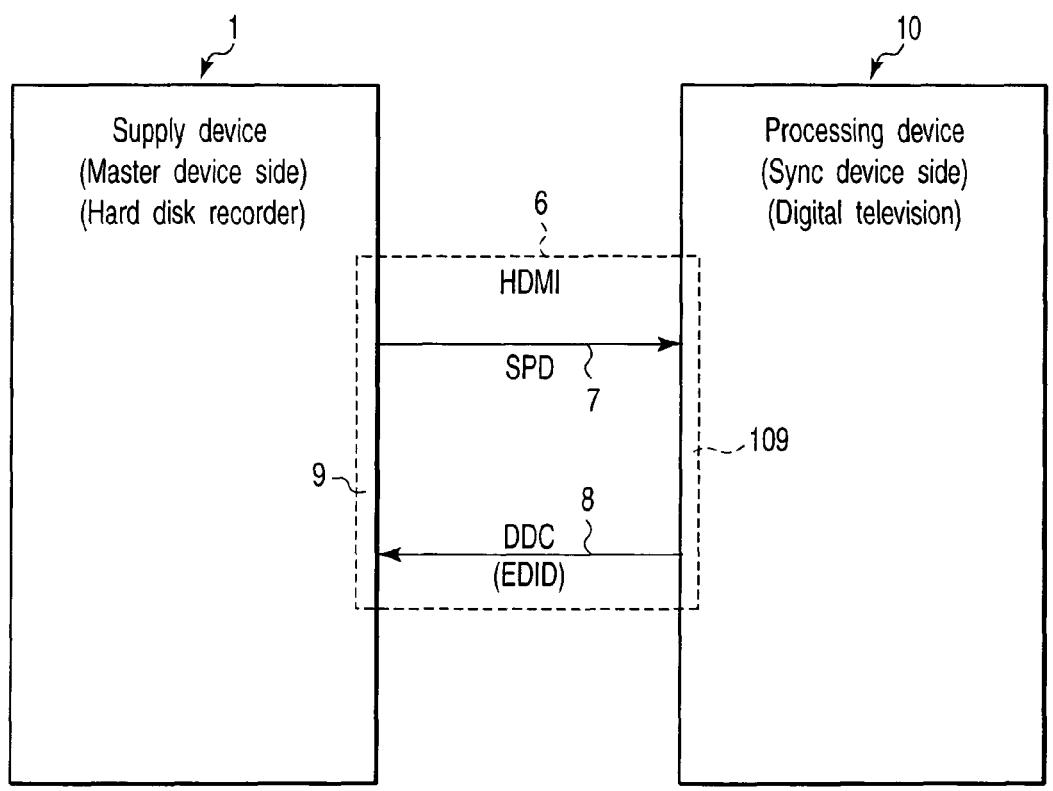
FIG. 1 is an explanatory diagram showing an example of connection between a supply device and a processing device according to an embodiment of the invention.
Figure 3:
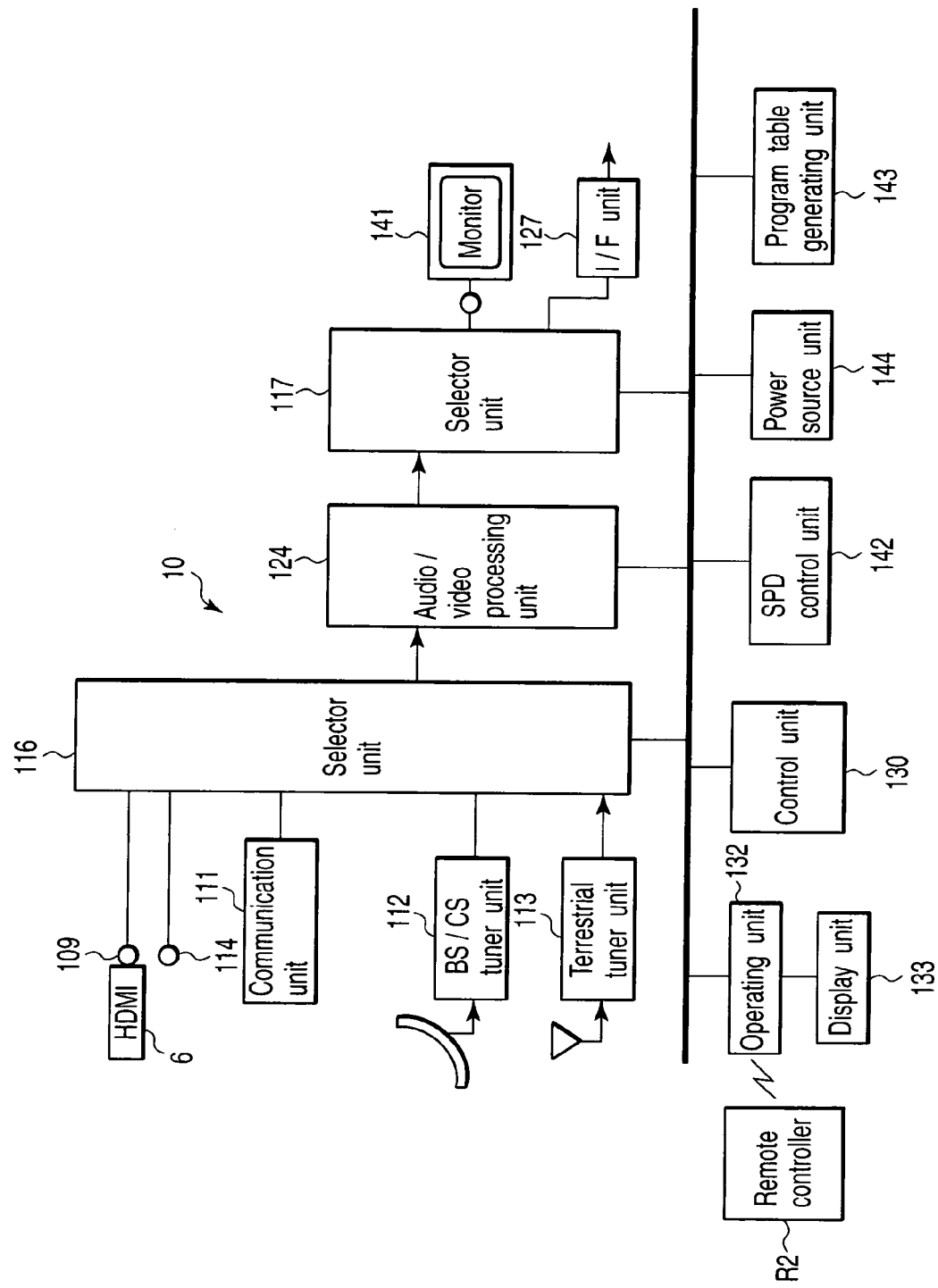
FIG. 3 is a block diagram showing an example of the configuration of a processing device according to an embodiment of the invention.

A supply device and a processing device according to the present invention can perform an instruction method utilizing the HDMI standard by using, by way of example, a hard disk recorder and a digital television shown in FIGS. 2 and 3. With this configuration as an example, explanation will be given with reference to the drawings hereinafter. FIG. 1 is an explanatory diagram showing an example of connection between a supply device and a processing device according to an embodiment of the invention. FIG. 2 is a block diagram showing an example of the configuration of a supply device according to an embodiment of the invention. FIG. 3 is a block diagram showing an example of the configuration of a processing device according to an embodiment of the invention. FIG. 4 is an explanatory view showing connection between a supply device and a processing device according to an embodiment of the invention.

<Supply Device and Processing Device as One Embodiment of the Invention>

Hereinafter, the relation among a supply device and a processing device according to an embodiment of the invention will be described with reference to FIG. 1. In FIG. 1, a supply device 1 has a communication function based on the HDMI standard, and herein, it is a device having a function of supplying contents of, for example, a hard disk recorder at the master device side, but not limited to a hard disk recorder. In the same manner, a processing device 10 in FIG. 1 has a communication function based on the HDMI standard, and herein, it is a device having a function of processing contents of, for example, a digital television at the sync device side, but not limited to a digital television.

A cable based on the HDMI standard is connected between the supply device 1 and the processing device 10, and a content signal 7 for supplying source product description (SPD) to be described later is supplied from the supply device 1 to the processing device 10. On the contrary, an EDID is supplied from the processing device 10 to the supply device 1 as a DCC signal 8 to be explained with a pin signal of an HDMI cable in FIG. 5. Note that in the instruction process to be described later, it is also preferable that the result of the instruction process is notified from the supply device 1 to the processing device 10 by means of the EDID by the DDC signal 8. As shown in FIG. 4, one end of the HDMI cable 6 is connected to an HDMI connector 9 of an HDMI interface of the supply device 1, and the other end thereof is connected to an HDMI connector 109 as an HDMI interface of the processing device 10.

<Supply Device: Recording and Reproducing Apparatus>

Hereinafter, an example of a recording and reproducing apparatus as one embodiment of the supply device according to the invention will be described with reference to the drawings. A recording and reproducing function of a hard disk and an optical disk is loaded on the recording and reproducing apparatus. However, the recording and reproducing function is not necessarily required, and it is sufficient so long as the apparatus has at least a communication function based on the HDMI standard.

(Configuration)

In the beginning, FIG. 2 is a block diagram showing an example of a recording and reproducing apparatus as an embodiment of the supply device according to the invention. A recording and reproducing apparatus 1 in FIG. 2 has two kinds of disk drive units. First, the recording and reproducing apparatus has an optical disk drive unit 19 that drives to rotate an optical disk D as a first medium which is an information recording medium capable of configuring video files to thereby perform reading and writing of information. Further, the recording and reproducing apparatus has a hard disk drive unit 18 that drives a hard disk as a second medium. A control unit 30 is connected to respective units via a data bus so as to manage the entire control.

Further, the recording and reproducing apparatus 1 in FIG. 2 includes an encoder unit 21 that configures a recording side, an MPEG decoder unit 23 that configures a replaying side, and a control unit 30 that controls the operation of the entire apparatus as its main structural components. The recording and reproducing apparatus 1 also has a selector 16 at the input side and a selector 117 at the output side.

Connected to the selector 16 at the input side are, as an example, an HDMI connector 9 of HDMI interface based on the HDMI standard that supplies a video signal or the like to the outside, and a communication unit 11 such as Ethernet (registered trademark) connected to a modem or the like. Herein, a modem (not shown) is connected to an Internet service provider or the like via an optical fiber and makes communications and the like to the Internet. Further, a so-called broadcasting satellite (BS/CS) tuner unit 12, and a so-called terrestrial tuner unit 13 are connected to the selector 16 at the input side, and the selector 16 outputs a signal to the encoder unit 21. Further, a satellite antenna is connected to the BS/CS tuner unit 12, and a terrestrial antenna is connected to the terrestrial tuner unit 13.

The recording and reproducing apparatus 1 also includes the encoder unit 21, a data editing unit 20 that receives the output of the encoder unit 21 to performs a desired data process such as data editing, and the hard disk drive unit 18 and the optical disk drive unit 19 that are connected to the data editing unit 20. Furthermore, the recording and reproducing apparatus 1 has an MPEG decoder unit 23 that receives signals from the hard disk drive unit 18 and the optical disk drive unit 19 to decodes the received signals, the encoder unit 21, a buffer unit 22, the MPEG decoder unit 23, a multiplexing unit 28, a demultiplexing unit 29, the control unit 30, an SPD control unit 42, a program table generating unit 43 that generates a reservation list and program table image and performs timer recording. These units are connected to the control unit 30 via the data bus. Moreover, the output of the selector unit 17 is supplied to an external monitor or the like, and supplied to an external device via the interface unit 27 that performs communications with the external device.

Furthermore, the recording and reproducing apparatus 1 has an operating unit 32 that is connected to the control unit 30 via the data bus to receive a user's operation and an operation from a remote controller R. Herein, the remote controller R can perform substantially the same operation as that of the operating unit 32 provided in the main body of the recording and reproducing apparatus 1. The remote controller R can instruct the recording and reproduction of the hard disk drive unit 18 and the optical disk drive unit 19, instruct editing, and operate the tuner, set the timer recording, and perform other settings.

(Operation)

In the recording and reproducing apparatus 1 having such a configuration, the BS/CS tuner unit 12 and the terrestrial tuner unit 13 receive and demodulate user's desired broadcasting signals, and supply the demodulated signals to the MPEG decoder unit 23 or an audio/video processing unit 24 via the selector unit 16 under the control of the control unit 30 according to the operation at the operating unit 32. As a consequence, the demodulated signals are output from the audio/video processing unit 24 as video/audio signals that can be displayed on a monitor 41, and are supplied to the monitor 41 and the I/F unit 27 to be displayed thereon.

In the recording and reproducing apparatus 1 having such a configuration, the outline of the reproducing process and the recording process will be explained with the optical disk as an example. Under the control of the control unit 30, laser beam is radiated on the optical disk D that is rotated at a predetermined speed, the reflected light is detected by an optical pickup, and a detected signal based on the detection is output. On the basis of the detected signal, an RF signal is generated, and the data reading process is performed, followed by the replaying process.

In the process of recording the optical disk, data supplied via, for example, an input unit (not shown) and the selector unit 16 is supplied to the encoder unit 21, and the supplied data is encoded and output, under the control of the control unit 30. According to this encoded output and the output of the control unit 30, a drive current of a laser driver is supplied to the optical pickup, and radiated to a storage area of the optical disk D, whereby the recording process is performed. Timer recording can be also performed by the program table generating unit 43.

Furthermore, in the recording and reproducing apparatus 1 having such a configuration, as described later herein, an HDMI packet is generated and an instruction signal is supplied to a processing device 10 described later herein via the HDMI connector 9 of the HDMI interface under the control of the control unit 30 and the SPD control unit 42, so that the instruction process can be performed.

<Processing Device: Digital Television>

A digital television as an example of the processing device according to the invention will be described with reference to FIG. 3.

(Configuration)

First, FIG. 3 is a block diagram showing an example of the configuration of the digital television according to an embodiment of the invention. In FIG. 3, a processing device 10 as the digital television has a selector 116 at the input side and a selector 117 at the output side.

Herein, an HDMI connector 109 as HDMI interface is connected to the selector 166 at the input side. An HDMI cable 6 for performing communications based on the HDMI standard is attached to the HDMI connector 109. Further, by way of example, the processing device 10 has a single or plural external input terminals 114 for taking in video signals and the like from the outside. The processing device 10 also has a communication unit 111 such as Ethernet to which a modem or the like (not shown) is connected.

Moreover, a so-called broadcasting satellite (BS/CS) tuner unit 112, and a so-called terrestrial tuner unit 113 are connected to the selector 116 at the input side, and the selector 116 outputs signals to an encoder unit 121. Further, a satellite antenna is connected to the BS/CS tuner unit 112, and a terrestrial antenna is connected to the terrestrial tuner 113.

The processing device 10 as a digital television has a program table generating unit 143 that generates a program table image, which is connected to a control unit 130 via the data bus. Furthermore, the output of the selector unit 117 is supplied to a monitor 141, and it is supplied to an external device via an interface unit 127 that performs communications with the external device.

Furthermore, the processing device 10 as a digital television has an operating unit 132 that is connected to the control unit 130 via the data bus to receives a user's operation and an operation from a remote controller R2. Herein, the remote controller R2 can perform substantially the same operation as that of the operating unit 132 provided in the main body of the recording and reproducing apparatus 1, and can operate the tuner and perform various settings.

A power source is supplied from a power source unit 144 to the monitor 141 as a display unit. Herein, the power source unit 144 is a power source whose operation is controlled by the control unit 130 and an SPD control unit 142. Meanwhile, power is supplied to the control unit 130, the SPD control unit 142, the communication unit 111, and the HDMI interface 109 by means of a power source unit (not shown), and they can control the operation of the power source unit 144. The power source unit 144 may not only supply the power to merely the monitor 141 as the display unit, but also supply the power to other circuits (especially, units of large consumption current) and the like.

(Operation)

In the processing device 10 as a digital television having such a configuration, the BS/CS tuner unit 112 and the terrestrial tuner unit 113 receive and demodulate user's desired broadcasting signals, and supply the demodulated signals to the audio/video processing unit 124 via the selector unit 116, under the control of the control unit 130 according to the operation at the operating unit 132. As a consequence, the demodulated signals are output from the audio/video processing unit 124 as video audio signals that can be displayed on the monitor 141, and are supplied to the monitor 141 and the I/F unit 127 to be displayed thereon.

As described later herein, under the control of the control unit 130 and the SPD control unit 142, an instruction signal of an HDMI packet acquired via the HDMI connector 9 of the HDMI interface is interpreted to perform a desired process.

<Instruction Process Using HDMI Packet>

Figure 8:
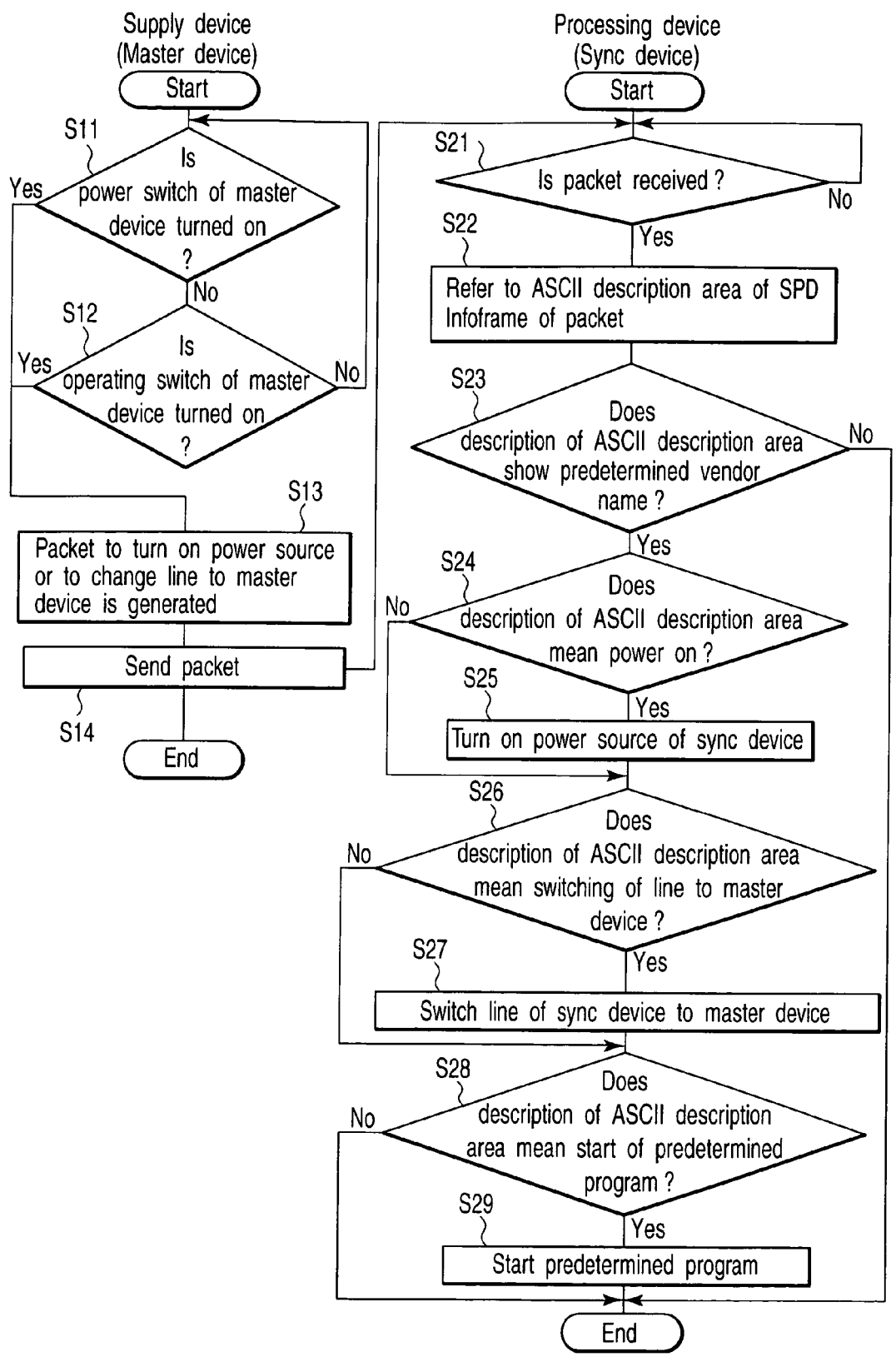
FIG. 8 is a flowchart showing an example of the processing between a supply device (master device) and a processing device (sync device) according to an embodiment of the invention.

Next, the instruction process by use of an HDMI packet according to an embodiment of the invention will be described in details with reference to the drawings. FIG. 5 is an explanatory table showing an example of pin signals of an HDMI cable for use in a supply device and a processing device according to an embodiment of the invention. FIG. 6 is an explanatory table showing an example of a plurality of packet types of HDMI interface according to an embodiment of the invention. FIG. 7 is an explanatory table showing an example of source product descriptor InfoFrame (SPD) as one of packet types of the HDMI interface according to an embodiment of the invention. FIG. 8 is a flowchart showing an example of the processing between a supply device (master device) and a processing device (sync device) according to an embodiment of the invention.

(HDMI Packet)

First, the data structure in the HDMI packet for use in the instruction process by use of the HDMI packet according to an embodiment of the invention will be described with reference to the drawings.

Signals of pins 1 to 19 of the HDMI connector 9 of the HDMI interface into which the HDMI cable 6 is inserted are shown respectively.

FIG. 6 shows the kinds of HDMI packets transferred by the HDMI cable 6. With respect to Packet Type Value, packet type value 0x00 is Null, 0x01 is Audio Clock Regeneration, 0x02 is Audio Sample, 0x03 is General Control, 0x04 is ACP Packet, 0x05 is ISRC1 Packet, 0x06 is ISRC2 Packet, 0x07 is One Bit Audio Sample Packet, and 0x08 InfoFrame Type is EIA/CEA-861B InfoFrame.

Herein, with regard to 0x80 InfoFrame Type, 0x81 is Vendor-Specific InfoFrame, 0x82 is AVI InfoFrame, 0x83 is Source Product Descriptor InfoFrame, 0x84 is Audio InfoFrame, and 0x85 is MPEG Source InfoFrame.

Display items and display contents of 0x83 Source Product Descriptor InfoFrame are specified by the Length of Source Product Description InfoFrame format in Table 16, as shown in "Table 16 Source Product Description InfoFrame format" in FIG. 7 (EIA/CEA-861-B ADTV Profile for Uncompressed High Speed Digital Interfaces: page 64 in [Non-patent Document 2]).

In Table 16, an ASCII description area is an area from data byte 1 to data byte 24 in the Length of Source Product Description InfoFrame. In the area, a vendor can arbitrarily define information by ASCII codes. Accordingly, by way of example, "Vendor Name Character" and "Product Description Character" can be defined in the ASCII description area.

As described later by use of a flowchart, it is possible to send various instructions from the supply device 1 to the processing device 10 by, for example defining "Power ON" or "Line Switching", further, "Specific Program" such as debugging to the source device information.

(Nonconformity in Operation Between Hard Disk Recorder and Digital Television)

Next, description will be given to the case in which, when the hard disk recorder 1 and the digital television 10 are connected with a video cable to be used as shown in FIG. 1, complicated operations are required. In FIGS. 1 to 4, for example, when a user tries to reproduce contents, such as a movie, recorded in the hard disk recorder 1, the user operates a power switch and a replay switch on the remote controller R or the operating unit 32 of the hard disk recorder 1. As a consequence, a content signal is output from, for example, the HDMI connector 9 of the hard disk recorder 1. However, the digital television 10 is not always turned on.

In this case, the user must perform complicated operations including operating the remote controller R or the operating unit 32 of the hard disk recorder 1, then operating the remote controller R or the operating unit 132 of the digital television 10, and thereby at least supplying the power source, followed by changing the line of the selector unit 116 to, for example, the HDMI connector 109. Further, there are specifications where the operation of the digital television 10 can be made by the remote controller R of the hard disk recorder 1. However, the user must perform complicated operations including switching an operation mode of the remote controller R into a hard disk recorder mode or switching it into a digital television mode. This gives the impression that it is difficult to operate a hard disk recorder to those young and aged users who are unfamiliar to operations, which has been a problem in the prior art.

(Instruction Process)

In an instruction process according to an embodiment of the invention, an instruction process for making operations extremely easy is performed, for example, to such a problem in the operation between the hard disk recorder and the digital television.

In the flowchart in FIG. 8, it is first determined whether or not the user presses down the power switch on the remote controller R or the operating unit 32 in the supply device (master device) such as the hard disk recorder 1 by means of the functions of the control unit 30 and the SPD control unit 42 (step S11). If the user does not press down it, it is determined whether or not the user presses down another switch of the remote controller R or the operating unit 32 (step S12).

When it is detected that any switch is pressed down, instruction information is generated in an ASCII code by the functions of the control unit 30 and the SPD control unit 42 (step S13). The instruction information means to turn on the digital television or to change the line to the hard disk recorder in the digital television. At the same time, as shown in FIG. 7, in the ASCII description area of SPD InfoFrame, instruction information by ASCII code meaning vendor name such as Company A, and further, product description of the hard disk recorder is generated by the functions of the control unit 130 and the SPD control unit 142. The instruction information and information of vendor name, product description and the like respectively generate an HDMI packet described in the ASCII description area of SPD (step S14), and the HDMI packet is supplied to the processing device 10 via the HDMI cable 6. Note that the vendor name, product description and other information are not necessarily required, and an embodiment of the present invention is embodied so long as it includes at least instruction information.

On the other hand, in the flowchart in FIG. 8, when it is detected that a packet is received in the processing device (sync device) such as the digital television 10 by means of the functions of the control unit 130 and the SPD control unit 142 (step S21), the ASCII description area shown in FIG. 7 of SPD InfoFrame of the packet is referred to (step S22).

Then, for example, if the digital television 10 is of Company A, it is determined whether or not the predetermined vendor described in the ASCII description area supplied from the hard disk recorder 1 shows Company A by the functions of the control unit 130 and the SPD control unit 142 (step S22). At this moment, it is also preferable that it is not determined whether or not the digital television 10 and the hard disk recorder 1 are of a same vendor, but there is a specific range like Company A of the digital television 10 and related Company B, Company C, Company D and the like. Herein, it is also preferable to determine whether or not the product description of the hard disk recorder 1 is appropriate from the product description described in the ASCII description area. However, this determination is not always required.

Next, by the operations of the control unit 130 and the SPD control unit 142, if it is determined that the vendor name and the like are appropriate, the process ends. If it is not determined that they are appropriate (step S23), the instruction information described in the ASCII description area of SPD is determined. That is, it is determined whether or not there is instruction information showing power on anywhere in the ASCII description area of SPD by the functions of the control unit 130 and the SPD control unit 142. If there is such instruction information, the power source unit 144 of the digital television 10 is turned on. As a result, the power source of the monitor 141 having a relatively large consumption power is supplied from, for example, the power source unit 144. Herein, it is also preferable that the power source supply of the power source unit 144 is not limited to the monitor 141, but also may be supplied to other units.

Next, it is determined whether or not there is instruction information showing switch of the line to the hard disk recorder 1 (master device) anywhere in the ASCII description area of SPD by the functions of the control unit 130 and the SPD control unit 142. If there is such instruction information, the selector switch 116 is switched to be controlled so as to select a content signal from the hard disk recorder 1 supplied from, for example, the HDMI connector 109, from a plurality of video signals from, for example, the terminal 114 or the like (step S27).

Further, by the functions of the control unit 130 and the SPD control unit 142, it is determined whether or not there is instruction information meaning a specific process execution such as starting a predetermined program or the like anywhere in the ASCII description area of SPD (step S28). If there is such instruction information, it is preferable to execute its processing execution. By way of example, it is preferable that this is a program for processing errors, but the present invention is not limited thereto (step S29).

As described above, according to the embodiment, when the user, in order to reproduce contents recorded in the hard disk recorder 1, touches the remote controller R of the hard disk recorder 1, and presses down, for example, the replay button, the SPD control unit 42 having detected the press generates an HDMI packet including instruction signals of power on and line switching, and the generated HDMI packet is supplied to the digital television 10 via the HDMI cable. The digital television 10 determines the instruction signals of power on and line switching by the functions of the SPD control unit 42 and the like. Then, the digital television 10 is turned on automatically, and the line is switched to the hard disk recorder 1.

As a consequence, when the user only touches the remote controller R of the hard disk recorder 1, the power supply and the line switching in the digital television 10 are performed automatically. For this reason, the hard disk recorder 1 and the digital television 10 work by only the operation on the remote controller R of the hard disk recorder 1 as if it is an integrated household electric appliance, so that the user can watch a desired program. Thereby, the present invention eliminates such complicated and difficult operations as operating respective devices separately as in the prior art. It becomes possible even for the aged and young users who are unfamiliar to the operation of digital apparatuses to use these systems through intuitive operations.

It may be well understood by those skilled in the art that each of the embodiments mentioned above includes various modifications of the invention, and by appropriate combinations of plural structural components disclosed in each of the embodiments. It is possible to extract various stages of invention, which is apparent to those skilled in the art. Accordingly, the present invention is not limited to the above embodiments, but the present invention may be embodied by appropriately modifying the structural components thereof without departing from the principle and innovative characteristics thereof disclosed herein.

For example, the instruction process as the above embodiment has been explained by use of the hard disk recorder 1 and the digital television 10, but one embodiment of the present invention is not limited thereto. It may be embodied between apparatuses which enable communications therebetween based on the HDMI standard (relation between a master device and a sync device). For example, cases are preferable where a personal computer is served as the master device, and a projector is served as the sync device.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A supply device comprising:
    an operating unit which detects a signal from an operating switch;
    a generating unit which generates an instruction packet signal including instruction information in response to the detected signal from the operating unit, and describes the instruction packet signal in an ASCII description area of source product description (SPD) of a packet signal for use in the high definition multimedia interface (HDMI) standard; and
    an interface unit comprising a plurality of pins including one pin which supplies the packet signal including the instruction packet signal to an external device via an HDMI cable.

2. A supply device according to claim 1, wherein the operating switch of the operating unit is a power switch of the supply device.

3. A supply device according to claim 1, wherein, upon detecting the instruction information from the ASCII description area of SPD of the packet signal detected by the detecting unit, the control unit turns on a power source unit which supplies power source to a part of the processing device accordingly.

4. A processing device comprising:
    an interface unit comprising a plurality of pins including one pin which receives a packet signal for use in the High definition multimedia interface (HDMI) standard from an external device via an HDMI cable;
    a detecting unit which detects an instruction packet signal including instruction information from an ASCII description area of source product description (SPD) of the packet signal; and
    a control unit which, upon detecting the instruction information from the ASCII description area of SPD of the packet signal detected by the detecting unit, controls a supply device so as to perform a desired operation accordingly.

5. A processing device according to claim 4, further comprising:
    a display unit which receives a content signal from the external device via the interface unit, and displays an image based on the content signal on a screen,
    wherein, upon detecting the instruction information from the ASCII description area of SPD of the packet signal detected by the detecting unit, the control unit turns on a power source unit which supplies power source to at least the display unit accordingly.

6. A processing device according to claim 4, further comprising:
    a selector unit which receives a contents signal from the external device via the interface unit, and selects one video signal from a plurality of video signals including the content signal to output the selected video signal,
    wherein, upon detecting the instruction information from the ASCII description area of SPD of the packet signal detected by the detecting unit, the control unit controls the selector unit so as to select the content signal accordingly.

7. An instruction method for providing an instruction from a supply device to a processing device via a high definition multimedia interface (HDMI) cable, the method comprising:
    detecting a signal from an operating switch in the supply device;
    generating an instruction packet signal including instruction information in response to the detected signal from an operating unit, and describing the instruction packet signal in an ASCII description area of source product description (SPD) of a packet signal for use in the HDMI standard, in the supply device;
    supplying the packet signal including the instruction packet signal from the supply device to the processing device by an interface unit comprising a plurality of pins including one pin via the HDMI cable; and
    detecting an instruction packet signal including the instruction information from the ASCII description area of SPD of the packet signal in the supply device, and performing a desired operation accordingly.

8. An instruction method according to claim 7, wherein, when the instruction information is detected from the ASCII description area of SPD of the packet signal, a power source unit which supplies power source to a part of the processing device is turned on accordingly.

9. An instruction method according to claim 7, wherein the processing device further comprises a display unit which receives a content signal from the supply device via the interface unit, and displays an image based on the content signal on a screen, and
    when the instruction information is detected from the ASCII description area of SPD of the detected packet signal, power source is supplied to at least the display unit accordingly.

10. An instruction method according to claim 7, wherein, when the instruction information is detected from the ASCII description area of SPD of the detected packet signal, control is made so as to run a program provided beforehand accordingly.

* * * * *